(12) United States Patent
Merkel

(10) Patent No.: US 8,618,684 B2
(45) Date of Patent: Dec. 31, 2013

(54) METHOD FOR OPERATING A WIND TURBINE

(75) Inventor: Maximilian Merkel, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 9 days.

(21) Appl. No.: 13/475,249

(22) Filed: May 18, 2012

(65) Prior Publication Data

US 2012/0292903 A1 Nov. 22, 2012

(30) Foreign Application Priority Data

May 18, 2011 (DE) .......................... 10 2011 101 897

(51) Int. Cl.
- *F03D 9/00* (2006.01)
- *H02P 9/04* (2006.01)
- *B64C 11/00* (2006.01)
- *B64C 27/00* (2006.01)

(52) U.S. Cl.
USPC ................................................ 290/44; 416/1

(58) Field of Classification Search
USPC .................................................. 290/44; 416/1
See application file for complete search history.

(56) References Cited

U.S. PATENT DOCUMENTS

| | | | | |
|---|---|---|---|---|
| 4,339,666 | A | * | 7/1982 | Patrick et al. ..................... 290/44 |
| 4,703,189 | A | * | 10/1987 | DiValentin et al. .............. 290/44 |
| 5,289,041 | A | * | 2/1994 | Holley ............................. 290/44 |
| 6,809,431 | B1 | | 10/2004 | Schippmann ..................... 290/55 |
| 7,023,105 | B2 | | 4/2006 | Wobben ............................ 290/44 |
| 7,420,289 | B2 | * | 9/2008 | Wang et al. ...................... 290/44 |
| 7,629,702 | B2 | * | 12/2009 | Schubert .......................... 290/44 |
| 7,663,260 | B2 | * | 2/2010 | Kabatzke et al. ................ 290/44 |
| 7,704,043 | B2 | * | 4/2010 | Kabatzke et al. .................. 416/1 |
| 7,902,689 | B2 | * | 3/2011 | Kinzie et al. ..................... 290/55 |
| 7,948,104 | B2 | * | 5/2011 | Andersen ......................... 290/44 |
| 8,093,737 | B2 | * | 1/2012 | Wittekind et al. .............. 290/44 |
| 8,096,761 | B2 | | 1/2012 | Fric et al. |
| 8,120,194 | B2 | * | 2/2012 | Hoffmann et al. .............. 290/44 |
| 8,128,362 | B2 | * | 3/2012 | Andersen et al. .................. 416/1 |
| 8,212,373 | B2 | * | 7/2012 | Wittekind et al. .............. 290/44 |
| 8,328,514 | B2 | * | 12/2012 | Viripullan et al. .............. 416/35 |
| 2002/0000723 | A1 | | 1/2002 | Weitkamp ........................ 290/44 |

(Continued)

FOREIGN PATENT DOCUMENTS

DE    10 2007 019 665 A1    10/2008

OTHER PUBLICATIONS

Van Der Hooft, E. et al, "Wind turbine control algorithms", DOWEC-F1W1-EH-03-094/0, Dec. 2003, ECN-C-03-111, XP003008410, pp. 1 to 84.

*Primary Examiner* — Pedro J Cuevas
(74) *Attorney, Agent, or Firm* — Walter Ottesen P.A.

(57) ABSTRACT

A method is provided for operating a wind turbine with a rotor having a rotor blade adjustable in its blade pitch angle. A generator is connected to the rotor and a measurement unit captures an actual value of a variable representative of a rotational speed of the generator. A set-point for a generator torque is provided and the set-point thereof is corrected. An actual value of a variable representative of a rotational speed of the generator is captured. A set-point for the torque as a function of the captured actual value is provided and the set-point for the torque as a function of a parameter for air density is corrected. A pitch angle value is captured and the set-point for the torque is increased when the captured value for the pitch angle exceeds a minimum value and has been corrected on the basis of an air density parameter.

8 Claims, 5 Drawing Sheets

(56) References Cited

U.S. PATENT DOCUMENTS

| | | | |
|---|---|---|---|
| 2006/0112688 A1* | 6/2006 | Vos et al. | 60/598 |
| 2006/0273595 A1* | 12/2006 | Avagliano et al. | 290/44 |
| 2007/0018457 A1* | 1/2007 | Llorente Gonzalez | 290/44 |
| 2007/0154311 A1* | 7/2007 | Kabatzke et al. | 416/1 |
| 2007/0216166 A1* | 9/2007 | Schubert | 290/55 |
| 2008/0001409 A1 | 1/2008 | Schellings | 290/44 |
| 2008/0112807 A1 | 5/2008 | Uphues et al. | 416/1 |
| 2008/0140263 A1 | 6/2008 | Wang et al. | 700/291 |
| 2009/0295160 A1* | 12/2009 | Wittekind et al. | 290/44 |
| 2010/0098540 A1* | 4/2010 | Fric et al. | 416/36 |
| 2010/0133818 A1* | 6/2010 | Kinzie et al. | 290/44 |
| 2010/0143121 A1* | 6/2010 | Haans et al. | 416/1 |
| 2010/0283246 A1* | 11/2010 | Christensen | 290/44 |
| 2010/0320761 A1 | 12/2010 | Schwarze et al. | 290/44 |
| 2011/0037263 A1 | 2/2011 | Warfen et al. | 290/44 |
| 2011/0064573 A1* | 3/2011 | Viripullan et al. | 416/1 |
| 2011/0215577 A1* | 9/2011 | Martin Da Silva et al. | 290/44 |
| 2011/0316277 A1* | 12/2011 | Skaare et al. | 290/44 |
| 2012/0091714 A1* | 4/2012 | Wittekind et al. | 290/44 |
| 2012/0146332 A1* | 6/2012 | Kabatzke et al. | 290/44 |
| 2012/0148402 A1* | 6/2012 | Kabatzke et al. | 416/1 |
| 2012/0189443 A1* | 7/2012 | Esbensen et al. | 416/1 |
| 2012/0282091 A1* | 11/2012 | Esbensen et al. | 416/1 |
| 2013/0101413 A1* | 4/2013 | Esbensen et al. | 416/1 |
| 2013/0110414 A1* | 5/2013 | Caponetti et al. | 702/35 |
| 2013/0166082 A1* | 6/2013 | Ambekar et al. | 700/287 |
| 2013/0187383 A1* | 7/2013 | Esbensen et al. | 290/44 |

* cited by examiner

METHOD FOR OPERATING A WIND TURBINE

CROSS REFERENCE TO RELATED APPLICATION

This application claims priority of German patent application no. 10 2011 101 897.6, filed May 18, 2011, the entire content of which is incorporated herein by reference.

FIELD OF THE INVENTION

The present invention relates to a method for operating a wind turbine wherein the wind turbine has a rotor having at least one rotor blade being adjustable in its blade pitch angle, a generator connected to the rotor for generating electrical power and at least one measurement unit for capturing an actual value of a variable representative of a rotational speed of the generator. In order to control the wind turbine, a set-point for a generator torque is provided as a function of the rotational speed of the generator, the actual value of the variable representative of the rotational speed of the generator being able to be accessed for this purpose. Further it is provided that the set-point for the generator torque is corrected as a function of a parameter for an air density.

BACKGROUND OF THE INVENTION

United States patent application publication 2008/0112807 discloses a method for operating a wind turbine in which the ambient temperature is measured and the output power of the wind turbine is reduced when the measured ambient temperature is below a predetermined temperature limit. Through this method, it is to be ensured that loads applied to the wind turbine at low temperatures are reduced.

United States patent application publication 2008/0001409 discloses a method for operating a wind turbine in which the control parameters of the wind turbine are optimized by means of a self-learning controller in order to achieve maximum power. The self-learning controller is dependent on the condition parameters which, for example, relate to the wind speed, wind direction, turbulence intensity, temperature, air pressure or the time duration since the last rainfall.

United States patent application publication 2008/0140263 discloses a method for predictive determination of a power curve for the wind turbine. The known method calculates a power curve for a wind turbine which is set up at a high altitude above sea level. In the method the $C_P$-$\lambda$-curve is calculated for a defined blade pitch angle. Subsequently, a first power curve without a limiting of the power is calculated from the $C_P$-$\lambda$-curve. The power curve for the wind turbine at high altitude is then calculated as a function of the air density from the first power curve with a corresponding power limiting.

United States patent application publication 2002/0000723 discloses a control system for a wind turbine in which measurement values for a location-dependent and weather-dependent turbine load and/or strain are captured. A downstream electronic signal processing system performs a power reduction in the region of the nominal wind speed and, at high wind speeds, limits this to the efficiency optimum corresponding to the current operating conditions.

SUMMARY OF THE INVENTION

It is an object of the invention to provide a method for operating a wind turbine in which an air density-dependent, reduced-power operation is corrected in order to achieve maximum power during a stable operation of the wind turbine.

The method of the invention is provided and defined for the operation of a wind turbine, wherein the wind turbine has a rotor having at least one rotor blade which is adjustable in its blade pitch angle, a generator connected to the rotor for generating electrical power and at least one measurement unit for capturing an actual value of a variable representative of a rotational speed of the generator and an actual value or set-point of the blade pitch angle. The operation of the wind turbine is performed by providing a set-point for a generator torque as a function of the actual value of the rotational speed. Further it is provided that, for the operation of the wind turbine the set-point for the generator torque is corrected as a function of a parameter for the air density. In particular, when the air density is decreasing the set-point for the generator torque is reduced in order to enable a stable operation of the wind turbine. The method according to the invention includes a method step in which a value for the blade pitch angle is captured. The value for the blade pitch angle can be a measured actual value or a read out set-point. Further, the method according to the invention provides that the set-point for the generator torque is increased when the captured value of the blade pitch angle exceeds a predetermined minimum value. The set-point for the generator torque is increased, in particular, when the previously given set-point for the generator torque is corrected on the basis of a parameter for the air density. A basis for the invention is the knowledge that in the case of a reduced-power operation of the wind turbine because of air density, the set-point for the generator torque should only be reduced for a predetermined wind speed. If the wind turbine is then operated at a lower air density but at higher wind speeds, it is possible to reduce the set-point for the generator torque to a lesser extent. Thus, in the method according to the invention, a correction of the set-point for the generator torque in reduced-power operation occurs as a function of the value of the blade pitch angle.

In a preferred embodiment, the captured values for the blade pitch angle are averaged over a time interval. A change to the set-point for the generator torque thus occurs in the method according to the invention when the values for the blade pitch angle exceed a minimum value when averaged over time. The time interval over which the values of the blade pitch angle are averaged is selected in such a manner that it is greater than the time constant of a control loop, in particular the control loop for the blade pitch angle.

In a preferred embodiment of the method according to the invention, an additional generator torque is determined in such a manner that an additional power of the wind turbine is proportional to the captured value of the blade pitch angle or to the averaged value of the blade pitch angle. The generator torque is then increased by the additional generator torque on the basis of the set-point for the generator torque during reduced-power operation. In an alternative embodiment, the additional generator torque is determined such that the additional generator torque is proportional to the captured value of the blade pitch angle or to the averaged value of the blade pitch angle. In these two alternatives either the set-point for the power or the set-point for the generator torque is increased in proportion to the captured value of the blade pitch angle or to the averaged value of the blade pitch angle. Because of the relationship between power, generator torque and rotational speed, these values can be converted into each other.

In a particularly preferred embodiment of the method according to the invention, it is ensured that the additional generator torque together with the set-point for the generator torque during reduced-power operation does not exceed the value which would result at a standard value for the air density. This means that, as a result of the additional generator torque and the associated increase of the set-point for the generator torque during reduced-power operation, no set-points are reached which are above the set-points for the generator torque which would result at standard conditions for the air density. As standard conditions for air density, for example, the air density at sea level is assumed.

In a further preferred embodiment, the set-point for the generator torque is increased only when the set-point for the generator torque has been corrected on the basis of a parameter for the air density. This method step ensures that the set-points for the generator torque are only increased when these have been corrected previously on the basis of the air density.

BRIEF DESCRIPTION OF THE DRAWINGS

The invention will now be described with reference to the drawings wherein.

DESCRIPTION OF THE PREFERRED
EMBODIMENTS OF THE INVENTION

For a better understanding of the invention, the physical-technical bases are first described.

In the method according to the invention, the air density is determined as a function of a measured air temperature T and a measured air pressure p. Preferably, a value for the humidity $\Psi$ can also be considered. The values for the air temperature and the air pressure are preferably measured directly at the wind turbine. The value $\Psi$ for the humidity can be provided as a function of a time of day and/or time of year. In the case of such a provision, a value $\Psi$ for the humidity gained from corresponding experience is provided. Alternatively, it is also possible to directly measure the humidity $\Psi$.

Figure 1A:
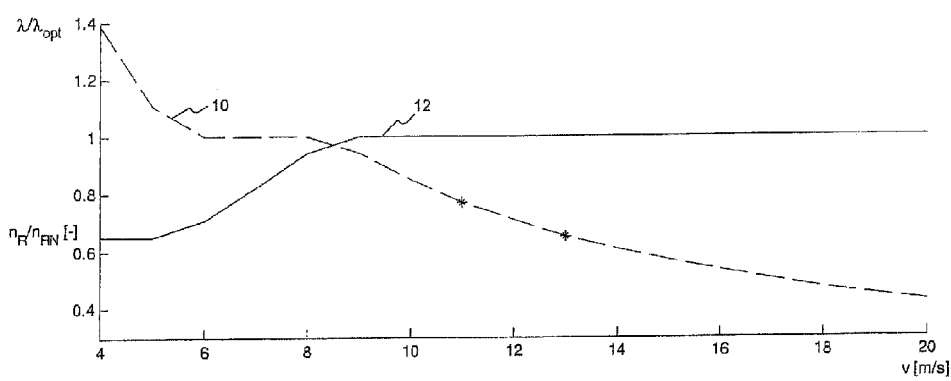
FIG. 1a shows two curves to explain the relationship between the tip speed ratio $\lambda$, the rotational speed of the rotor $n_R$ and the wind speed v.

FIG. 1a shows the course 10 of the relationship of the tip speed ratio $\lambda$ in relation to an optimal tip speed ratio $\lambda_{opt}$ for the rotor blade as a function of the wind speed v. The rotor of a wind turbine with its, for example three, rotor blades has a characteristic tip speed ratio $\lambda_{opt}$ at which the power coefficient $C_p$ is at a maximum. It is therefore an aim that the wind turbine is, if possible, operated with the optimal tip speed ratio $\lambda_{opt}$. This is limited by the permissible rotational speed range for the generator-converter system of the wind turbine and by the maximum permissible rotor blade tip speed. Practically, the rotor can thus only be operated with the optimal tip speed ratio $\lambda_{opt}$ in a narrow range of the wind speed v. The curve 10 in FIG. 1a shows, as an example, that in the range of wind speed v from approximately 6 m/s to 9 m/s, the rotor can be operated with the optimal tip speed ratio $\lambda_{opt}$. At higher wind speeds v, the rotational speed of the rotor $n_R$ cannot be further increased which leads to a drop in the tip speed ratio $\lambda$. In this range, the ratio of the rotational speed of the rotor $n_R$ to the nominal rotational speed of the rotor $n_{RN}$ shown in course 12 in FIG. 1a is constant and approximately equal to 1.

Figure 1B:
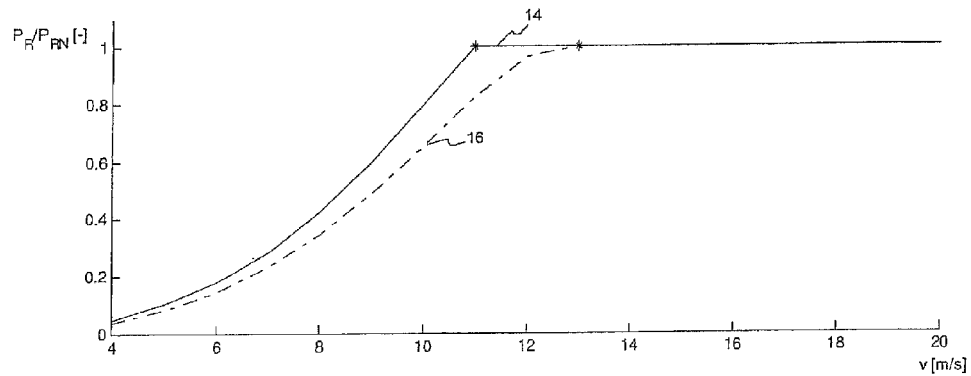
FIG. 1b shows two characteristic curves to explain the effect of the air density $\rho$ on the power curve of a wind turbine.

FIG. 1b shows the course 14 of the ratio of the power of the rotor $P_R$ in relation to the nominal power of the rotor $P_{RN}$ at a standard air density $\rho_0$. At a standard air density of $\rho_0$=1.225 kg/m$^3$, the nominal power $P_{RN}$ is achieved at a wind speed v of approximately 11 m/s. At higher wind speeds v, the power of the rotor $P_R$ is limited by adjusting the blade pitch angle $\beta$. The characteristic curve 16, also shown in FIG. 1b, shows the ratio of the power of the rotor $P_R$ to the nominal power of the rotor $P_{RN}$ at a reduced air density $\rho_1$. At a reduced air density of $\rho_1$=1.0 kg/m$^3$, the power of the rotor $P_R$ received from the wind decreases and the nominal power $P_{RN}$ is only achieved at a wind speed v of approximately 13 m/s. The comparison with the curve 10 of FIG. 1a shows that the rotor for wind speeds v, at which the nominal power $P_{RN}$ was achieved, already has a tip speed ratio $\lambda$ which is less than the optimal tip speed ratio $\lambda_{opt}$ and that the tip speed ratio $\lambda$ at which the nominal power $P_{RN}$ is achieved decreases with falling air density $\rho$.

Figure 2:
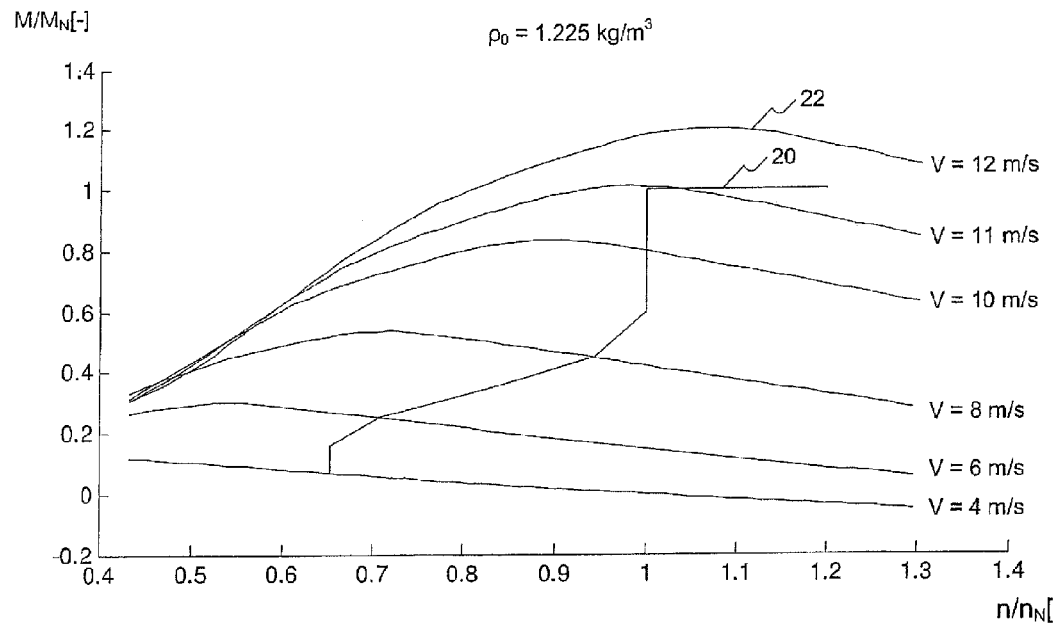
FIG. 2 shows the control characteristic curve for the generator torque $M_G$ as well as curves for the rotor torque $M_R$ at various wind speeds v as a function of the rotational speed n.

Wind turbines are in general not controlled as a function of the wind speed v. The control of the generator power $P_G$ and thus the corresponding control of the generator torque $M_G$ is effected as a function of the rotor rotational speed $n_R$. FIG. 2 shows a control characteristic curve 20 for the generator torque $M_G$ as a function of the rotational speed n at a standard air density of $\rho_0$=1.225 kg/m$^3$. From characteristic curve 20, it can be clearly seen that the nominal power $P_{GN}$ of the generator is achieved for the nominal rotational speed $n_N$. FIG. 2 simultaneously shows the rotor torque $M_R$, corresponding to the curves 22, which is effective at the rotor at the individual assumed wind speeds of v=4 m/s, 6 m/s, 8 m/s, 10 m/s, 11 m/s and 12 m/s. The comparison of the control characteristic curve 20 of the generator with the curve 22, which shows the rotor torque $M_R$ as a function of the wind speed v, shows that, at the transition of the characteristic curve 20 to the nominal value of the generator torque $M_{GN}$, there must be a wind speed v of 11 m/s. From the curves 22, it can also be seen that the rotor torque $M_R$ as a function of the rotor speed $n_R$ has a maximum at constant wind speed v. Here it is important for the control characteristic curve 20 that the generator torque $M_G$ set according to the control characteristic curve 20 is always to the right of the maximum of the rotor torque $M_R$ in curve 22. As a result, the rotor rotational speed $n_R$ is autonomously stabilized because the rotor torque $M_R$ at an operating point which is located to the right of the maximum of the curve 22 increases when the rotor rotational speed drops and thus the rotational speed n increases again. The operating points of the control characteristic curve 20 are thus self-stabilizing operating points.

Figure 3:
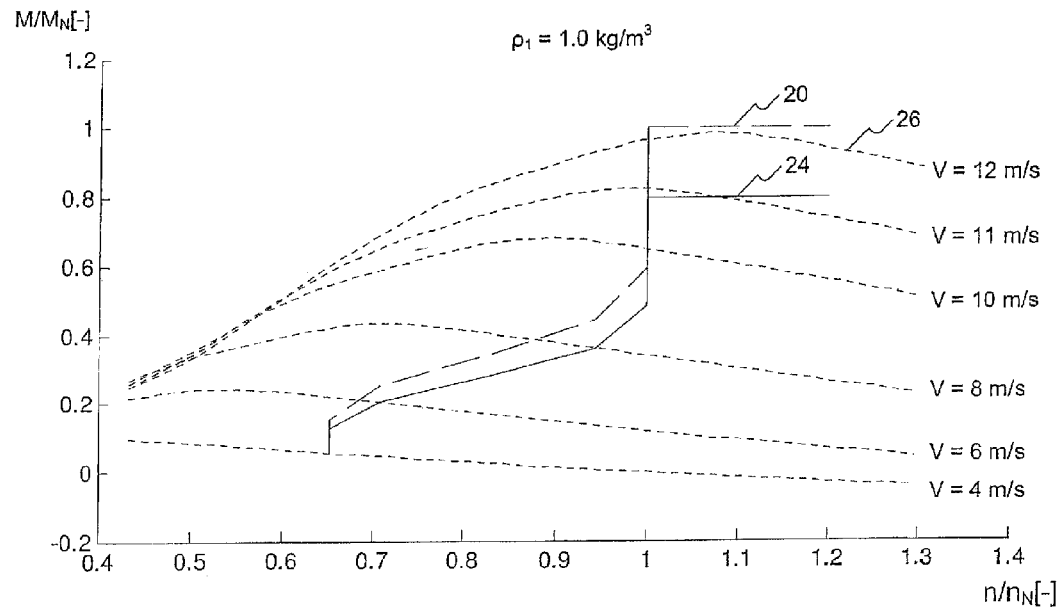
FIG. 3 shows a control characteristic curve corrected for air density for the generator torque $M_G$ as well as curves for the rotor torque $M_R$ at various wind speeds v as a function of the rotational speed n.

FIG. 3 shows a characteristic curve 24 which corresponds to a control characteristic curve of the generator at an air density of $\rho_1$=1 kg/m$^3$. It can also clearly be seen in FIG. 3, in comparison to FIG. 2, that at the same wind speed v the curve 26 shows less rotor torque $M_R$ which can be obtained from the wind. In regards to the characteristic curve 24 it is again important that the operating points are each located to the right of the maximum of the curve 26, so that the operating points on the characteristic curve 24 are self-stabilizing. For a better comparison, the characteristic curve 20, which corresponds to the characteristic curve 20 of FIG. 2, is also shown in FIG. 3. Here it can be seen that the maximum of the curve 26 for v=12 m/s is to the right of the steep branch of the control characteristic curve 20. This means that an operating point in the transition of the characteristic curve to the region of the nominal power would not be self-stabilizing in the case of a characteristic curve for an air density of $\rho_1=1$ kg/m$^3$ which is not corrected for air density.

In FIG. 3, in a comparison of the characteristic curves 20 and 24, it can also be seen that at the nominal rotational speed $n_N$, the nominal torque of the generator $M_{GN}$ at an air density of $\rho_1=1$ kg/m$^3$ is reduced to approximately 80% of the nominal torque $M_{GN}$ at a standard air density of $\rho_0=1.225$ kg/m$^3$. This reduction of the nominal torque $M_{GN}$ naturally leads to a reduction of the nominal power and the yield of the wind turbine.

The invention provides for correcting the rotational speed-dependent control characteristic curve 24 of the wind turbine. The correction is done as a function of the blade pitch angle β.

At a small blade pitch angle β before reaching the nominal rotational speed $n_N$, the generator torque $M_G$, and therefore the power of the generator $P_G$, is given only from the control characteristic line 24 which is corrected for air density. If the blade pitch angle β is increased as a result of the rotational speed control of the wind turbine, this, at the same tip speed ratio λ, leads to a lower angle of attack of the rotor blades so that the generator torque $M_G$ can also be increased without leaving the stable region of the rotor characteristic diagram. In particular, this means that in the invention, the power P of the wind turbine is increased by an additional contribution $\Delta M_G$ to the set-point for the generator torque $M_G$. The additional portion $\Delta M_G$ to the set-point of the generator torque $M_G$ means that the yield reduction as a result of the correction of the air density ρ can, at least at high wind speeds v, be compensated.

The method of the invention provides the following method steps:
capturing an actual value of a variable representative of a rotational speed of the generator $n_G$,
providing a set-point for the generator torque $M_G$ as a function of the captured actual value of the variable representative of the rotational speed of the generator $n_G$,
capturing a value for the blade pitch angle β,
increasing the set-point for the generator torque $M_G$ when the captured value for the blade pitch angle β exceeds a predetermined minimum value $β_{min}$.

Preferably, the actual value of the rotational speed of the generator is captured as the actual value of a variable representative of the rotational speed of the generator.

For the stabilization of the method, it can be provided that the captured value for the blade pitch angle β is continuously averaged over a predetermined time period. The value for the blade pitch angle can be a measured actual value and/or a set-point present in the control of the blade pitch angle.

Figure 4:
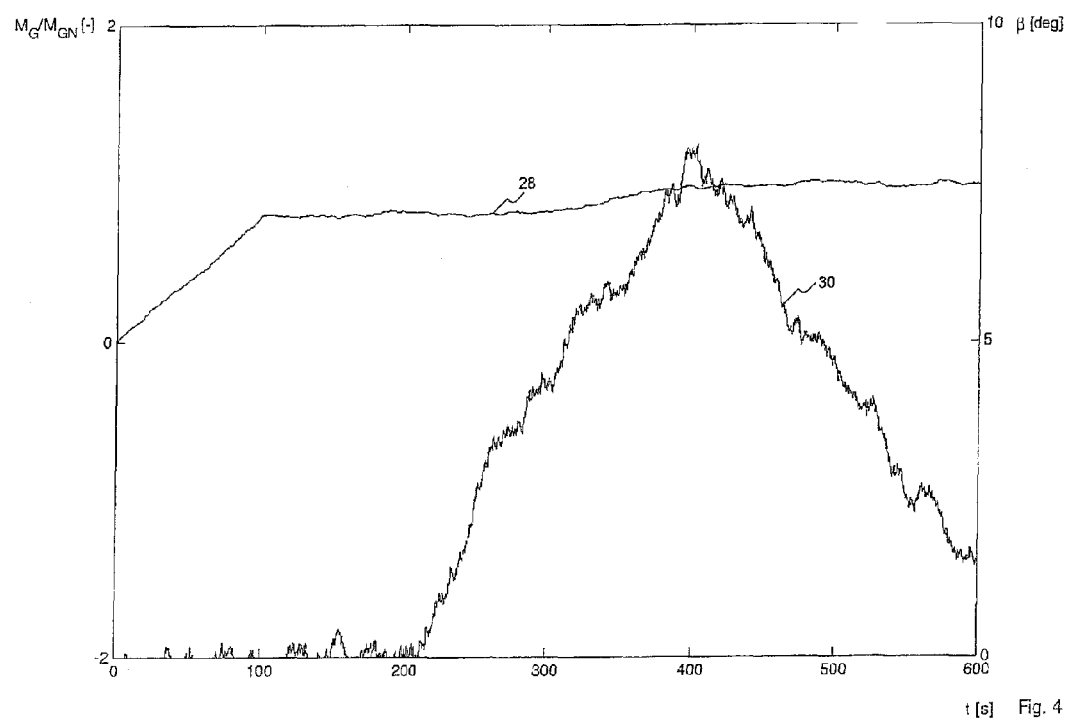
FIG. 4 shows the course of the generator torque $M_G$ and of the blade pitch angle $\beta$ during reduced-power operation as a function of the time t.

FIG. 4 as an example shows the course 28 of the generator torque $M_G$ and the course 30 of the blade pitch angle β as a function of the time t. The set-point of the generator torque $M_G$ in the reduced-power operation mode at a reduced air density $\rho_1$ is approximately 80% of the nominal value for the generator torque $M_{GN}$ during operation at a standard air density $\rho_0$. Starting at a time period of approximately 200 seconds, the blade pitch control starts up and, up to a time period of approximately 400 seconds, increases the blade pitch angle β up to values of 8°. Because of the high values for the blade pitch angle β averaged over time, the set-point for the generator torque $M_G$ is increased starting approximately at a time period of 300 seconds. As shown in FIG. 4, this leads to an increase of the generator torque $M_G$ corresponding to curve 28. The blade pitch angle β, which further increases corresponding to curve 30 even in the time interval of 300 s to 400 s, leads to a further increase of the set-point for the generator torque $M_G$. The high generator torque $M_G$ causes a reduction of the rotor rotational speed $n_R$ which subsequently also reduces the blade pitch angle β because of the rotational speed control. This in turn leads to an increase of the rotor torque $M_R$. At time t=600 seconds, the blade pitch angle β has again reached a low value of approximately 1° to 2° and the resulting rotor torque $M_R$ now corresponds to the clearly higher generator torque $M_G$ corresponding to curve 28. In this way, a higher yield can reliably be achieved even in an operating mode of the wind turbine which is corrected for air density.

Figure 5:
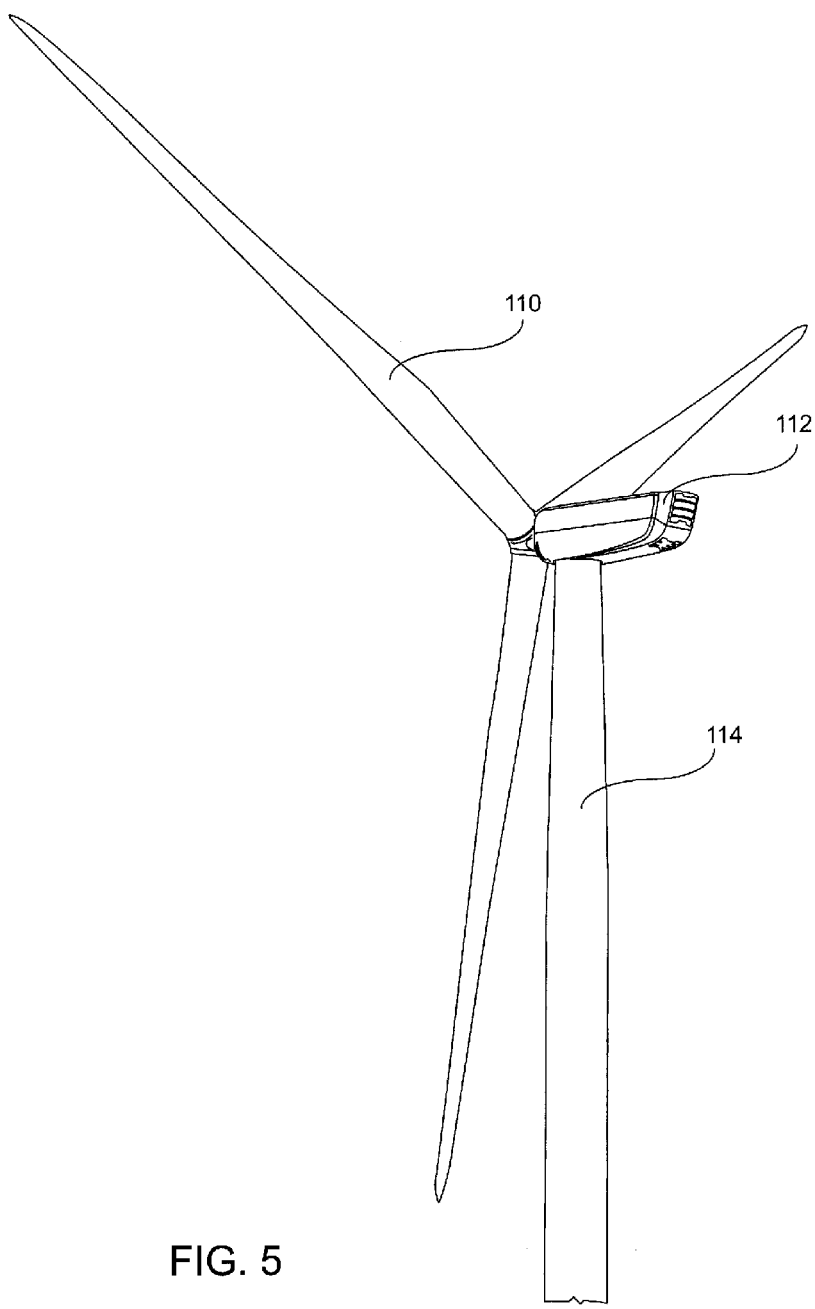
FIG. 5 is a schematic of a wind turbine having three rotor blades.

FIG. 5 shows a wind turbine having three rotor blades 110, a nacelle 112 and a tower 114.

Figure 6:
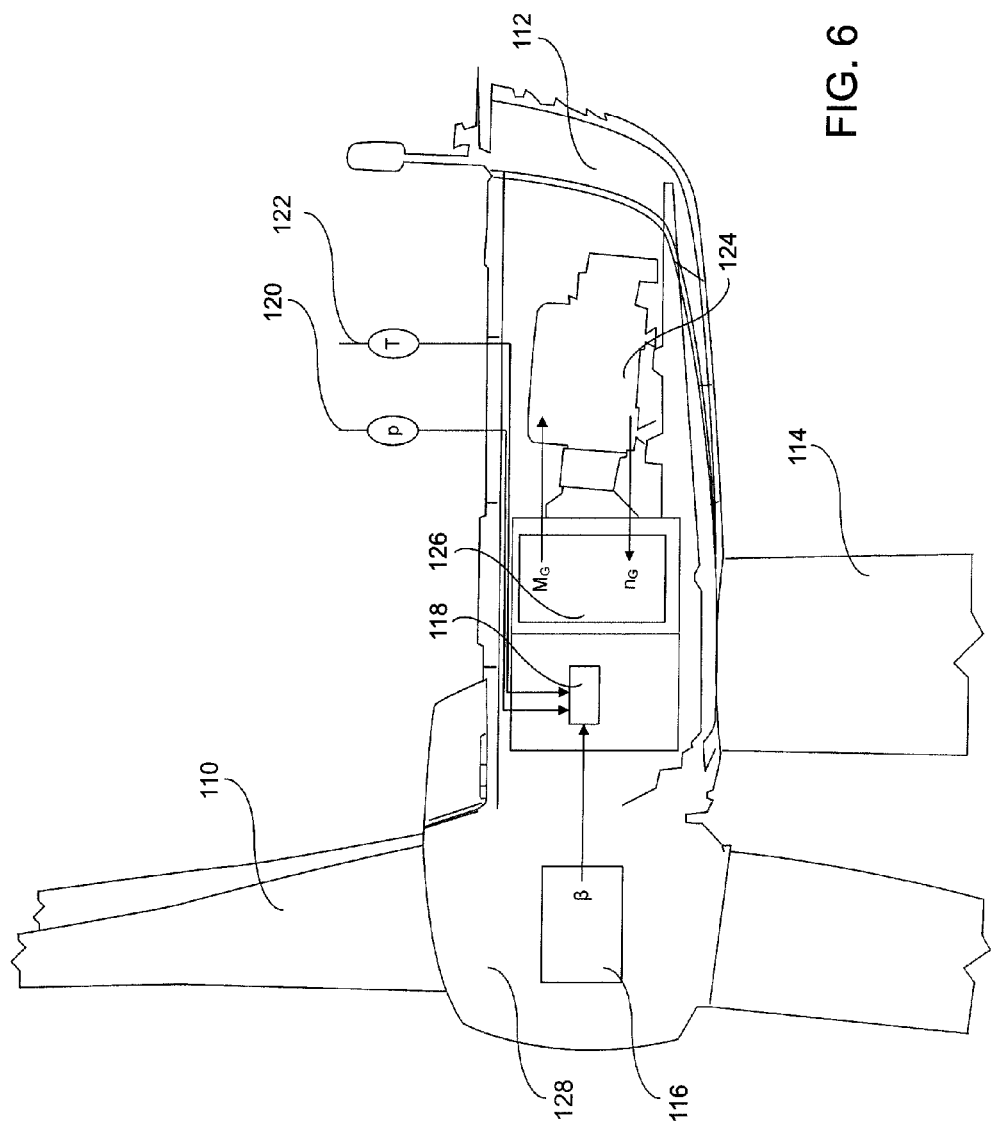
FIG. 6 is a schematic of the nacelle of the wind turbine shown in FIG. 5.

FIG. 6 shows a schematic of the nacelle 112 in which means 116 for measuring a blade pitch angle β are provided within a rotor hub 128. The means 116 for measuring the blade pitch angle β are shown in a schematic view. Each of the rotor blades 110 may have its individual blade pitch angle β and individual means for measuring its blade angle. The measured blade pitch angle β is forwarded to a control unit 118 to which also the measured values of the air pressure p and the air temperature T are provided. The value of the air pressure p is measured by an air pressure sensor 120 and the air temperature T is measured by a temperature sensor 122. The control unit 118 determines a parameter for the air density ρ from at least one of the measured values.

A set point for the generator torque $M_G$ is forwarded to a generator 124 by a generator control unit 126. The generator control unit 126 also receives the rotational speed $n_G$ of the generator in order to determine the set point for the generator torque $M_G$. The control unit 118 and the generator control unit 126 are in communication for data exchange.

It is understood that the foregoing description is that of the preferred embodiments of the invention and that various changes and modifications may be made thereto without departing from the spirit and scope of the invention as defined in the appended claims.

What is claimed is:

1. A method for operating a wind turbine, wherein the wind turbine has a rotor having at least one rotor blade which can be adjusted in its blade pitch angle (β), a generator connected to the rotor for generating electrical power and at least one measurement unit for capturing an actual value of a variable representative of a rotational speed of the generator, wherein a set-point for a generator torque ($M_G$) is provided as a function of a rotational speed (n) and the set-point is corrected as a function of a parameter for an air density (ρ), said method comprising the steps of:

capturing an actual value of a variable representative of a rotational speed of the generator ($n_G$);
providing a set-point for the generator torque ($M_G$) as a function of the captured actual value of the variable representative of the rotational speed of the generator ($n_G$);
correcting the set-point for the generator torque as a function of a parameter for the air density (ρ);
capturing a value for the blade pitch angle (β); and,
increasing the set-point for the generator torque ($M_G$) when the captured value for the blade pitch angle (β) exceeds a predetermined minimum value ($β_{min}$) and the set-point for the generator torque ($M_G$) has been corrected on the basis of the parameter for the air density ($\rho$).

2. The method of claim 1 further comprising the step of averaging the captured values for the blade pitch angle ($\beta$) over a predetermined time interval.

3. The method of claim 1 further comprising the steps of:
determining an additional generator torque ($\Delta M_G$) in such a manner that an additional power ($\Delta P$) of the wind turbine is dependent upon one of the captured value for the blade pitch angle ($\beta$) and the averaged value for the blade pitch angle ($\beta$); and,
increasing the set-point for the generator torque ($M_G$) by the additional generator torque ($\Delta M_G$).

4. The method of claim 3 further comprising the step of determining an additional generator torque ($\Delta M_G$) in such a manner that the additional power ($\Delta P$) of the wind turbine is proportional to one of the captured value for the blade pitch angle ($\beta$) and the averaged value for the blade pitch angle ($\beta$).

5. The method of claim 1 further comprising the steps of:
determining an additional generator torque ($\Delta M_G$) in such a manner that an additional generator torque ($\Delta M_G$) of the wind turbine is dependent upon one of the captured value for the blade pitch angle ($\beta$) and the averaged value for the blade pitch angle ($\beta$); and,
increasing the set-point for the generator torque ($M_G$) by the additional generator torque ($\Delta M_G$).

6. The method of claim 1 further comprising the step of determining an additional generator torque ($\Delta M_G$) in such a manner that an additional generator torque ($\Delta M_G$) of the wind turbine is proportional to one of the captured value for the blade pitch angle ($\beta$) and the averaged value for the blade pitch angle ($\beta$).

7. The method of claim 3 further comprising the step of limiting the set-point for the generator torque ($M_G$) to a maximum value which results at a standard value for the air density ($\rho_0$).

8. The method of claim 1 further comprising the step of limiting the set-point for the generator torque ($M_G$) to a maximum value which results at a standard value for the air density ($\rho_0$).

* * * * *